(12) United States Patent
Zhang

(10) Patent No.: US 11,838,042 B2
(45) Date of Patent: Dec. 5, 2023

(54) PROTECTIVE FILM OF ELECTRONIC TERMINAL

(71) Applicant: SHENZHEN HONGJIANTOU TECHNOLOGY CO., LTD, Guangdong (CN)

(72) Inventor: Zhinan Zhang, Guangdong (CN)

(73) Assignee: SHENZHEN HONGJIANTOU TECHNOLOGY CO., LTD, Shenzhen (CN)

( * ) Notice: Subject to any disclaimer, the term of this patent is extended or adjusted under 35 U.S.C. 154(b) by 353 days.

(21) Appl. No.: 17/372,514

(22) Filed: Jul. 11, 2021

(65) Prior Publication Data

US 2021/0391884 A1 Dec. 16, 2021

Related U.S. Application Data

(63) Continuation of application No. PCT/CN2020/095289, filed on Jun. 10, 2020.

(51) Int. Cl.
*H04B 1/3888* (2015.01)
*G02B 1/14* (2015.01)
*B32B 37/12* (2006.01)
*C09J 7/30* (2018.01)

(52) U.S. Cl.
CPC .......... *H04B 1/3888* (2013.01); *B32B 37/12* (2013.01); *C09J 7/30* (2018.01); *G02B 1/14* (2015.01); *B32B 2457/208* (2013.01)

(58) Field of Classification Search
None
See application file for complete search history.

(56) References Cited

U.S. PATENT DOCUMENTS

| | | | |
|---|---|---|---|
| 9,007,521 B2 * | 4/2015 | Viinikanoja | G02B 13/009 348/340 |
| 9,241,051 B1 * | 1/2016 | Peterson, III | H04M 1/185 |
| 9,496,911 B2 * | 11/2016 | Brand | A45F 5/00 |
| 9,814,151 B2 * | 11/2017 | Probst | H04B 1/3888 |

(Continued)

FOREIGN PATENT DOCUMENTS

| CN | 207939616 | * 10/2018 | ............ H04N 5/225 |
|---|---|---|---|
| CN | 209375735 U | 9/2019 | |

(Continued)

OTHER PUBLICATIONS

Search report of counterpart European Patent Application No. 20908439.1 dated Sep. 15, 2022.

(Continued)

*Primary Examiner* — Tuan A Tran

(57) ABSTRACT

The present application discloses a protective film of electronic terminal configured to be attached to an electronic terminal mounted with a camera and protect a screen of the electronic terminal. The protective film of electronic terminal includes a protective film body and a shielding member. The protective film body is defined with an avoidance hole and an accommodating cavity. The avoidance hole is for avoiding the camera when the protective film body is attached to the electronic terminal and in communication with the accommodating cavity. The shielding member is movably arranged in the accommodating cavity for shielding or not shielding the camera.

15 Claims, 5 Drawing Sheets

(56) References Cited

U.S. PATENT DOCUMENTS

| | | | |
|---|---|---|---|
| 9,866,254 B2* | 1/2018 | Lin | H04B 1/3888 |
| 10,310,552 B2* | 6/2019 | Igarashi | G06F 1/1626 |
| 10,433,446 B2* | 10/2019 | Igarashi | H05K 5/03 |
| 11,415,727 B2* | 8/2022 | Zhou | G02B 7/021 |
| 2010/0079661 A1* | 4/2010 | Lin | H04N 23/57 |
| | | | 348/E5.022 |
| 2011/0279897 A1* | 11/2011 | Ohuchi | H04N 23/51 |
| | | | 361/679.01 |
| 2015/0311941 A1 | 10/2015 | Sorrentino | |
| 2019/0033922 A1* | 1/2019 | Chou | G06F 1/1656 |
| 2020/0017391 A1* | 1/2020 | Liang | C03B 11/122 |
| 2020/0244299 A1* | 7/2020 | Zhang | B32B 7/06 |

FOREIGN PATENT DOCUMENTS

| | | | | |
|---|---|---|---|---|
| CN | 209390131 U | 9/2019 | | |
| CN | 110995990 A | 4/2020 | | |
| CN | 210376738 U | 4/2020 | | |
| DE | 202019106202 U1 | 11/2019 | | |
| TW | M590699 U | 2/2020 | | |
| WO | 2019145007 A1 | 8/2019 | | |
| WO | WO 2019/145007 | * | 8/2019 | A45C 11/00 |

OTHER PUBLICATIONS

International Search Report of PCT Patent Application No. PCT/CN2020/095289 dated Mar. 17, 2021.

* cited by examiner

PROTECTIVE FILM OF ELECTRONIC TERMINAL

CROSS-REFERENCE TO RELATED APPLICATIONS

The present application is a continuation application of PCT Application No. PCT/CN2020/095289, filed on Jun. 10, 2020. The disclosure of the aforementioned application are hereby incorporated by reference in its entirety.

TECHNICAL FIELD

The present application relates to the technical field of electronic equipments, in particular to a protective film of electronic terminal.

BACKGROUND

An electronic terminal such as a mobile phone, a tablet computer or the like, is usually equipped with a webcam. The webcam is a new generation product combining traditional camera with network video technology. In addition to the image capture function of an ordinary traditional camera, the webcam also has a built-in digital compression controller and a network-based operating system, which not only brings convenience to life, but also enables hackers to control it through the network, thus bringing potential safety hazards to users' privacy.

SUMMARY

The main purpose of the present application is to propose an electronic terminal protective film, aiming at protecting the privacy of users of cameras.

To achieve the above purpose, a protective film of electronic terminal configured to be attached to an electronic terminal on which a camera is mounted and protect a screen of the electronic terminal, the protective film of electronic terminal includes:
 a protective film body defined with an avoidance hole and an accommodating cavity, wherein the avoidance hole is configured to avoid the camera when the protective film body is attached to the electronic terminal and in communication with the accommodating cavity; and
 a shielding member movably arranged in the accommodating cavity and configured to shield or not shield the camera.

In one embodiment, the protective film body includes a first bonding layer and a second bonding layer, the first bonding layer is configured to be attached to the electronic terminal, the avoidance hole penetrating through the first bonding layer and the second bonding layer, an edge of the second bonding layer being attached to the first bonding layer, and the accommodating cavity being formed at a position corresponding to a middle portion of the second bonding layer and configured to cover the shielding member.

In one embodiment, the second bonding layer is defined with a long strip-shaped avoidance groove communicating with the avoidance hole, and the shielding member is at least partially exposed to the avoidance groove, and configured for a user to slide the shielding member along a length extension direction of the avoidance groove.

In one embodiment, the shielding member is provided with a protrusion protruded outside the avoidance groove; or, the shielding member is completely located in the avoidance groove, and a surface of the shielding member is provided with anti-skid lines.

In one embodiment, the shielding member is an opaque circular piece.

In one embodiment, each of the first bonding layer and the second bonding layer has an inner side facing inside of the accommodating cavity, the inner side of the first bonding layer or the inner side of the second bonding layer is defined with a sinking groove corresponding to a periphery of the avoidance hole, and a shape of the sinking groove is matched with a shape of the shielding member, and the sinking groove is configured to accommodate the shielding member when the shielding member shields the camera.

In one embodiment, a notch of the sinking groove is rounded.

In one embodiment, the protective film body is transparent, the first bonding layer has an inner side facing inside of the accommodating cavity, and the inner side of the first bonding layer is provided with an opaque warning portion corresponding to a periphery of the avoidance hole, a shape of the warning portion is matched with a shape of the shielding member, and the warning portion is set to warn a user when the shielding member does not shield the camera.

In one embodiment, the first bonding layer has an outer side facing outside of the accommodating cavity, and the outer side of the first bonding layer is provided with an adhesive layer configured to adhere the protective film of electronic terminal to the electronic terminal.

In one embodiment, each of the second bonding layer, the first bonding layer, and the shielding member has a thickness ranged from 0.1 mm to 0.2 mm.

By adopting the protective film body, the technical scheme of the present application can play a role of protecting the screen, prevent the screen from being scratched, at the same time, it reduces the probability of the screen being smashed. By adopting the avoidance hole and the accommodating cavity defined on the protective film body, the avoidance hole avoids the camera, the shielding member is movably disposed in the accommodating cavity, and can be moved to different positions of shielding the camera or not shielding the camera in the accommodating cavity. When the camera needs to be used, the shielding member can be moved to a position where the camera is not shielded, thus to normally use the camera, when the camera is not needed, the shielding member can be moved to the position of shielding the camera, thereby protecting the privacy of the user, that is, the technical scheme of the present application can protect the privacy of the user while protecting the screen.

BRIEF DESCRIPTION OF THE DRAWINGS

In order to more clearly illustrate the embodiments of the present application or the technical aspects of the exemplary technology, the follow will briefly describe the drawings need to be used in the description of the embodiments or the exemplary techniques. As will be apparent, the drawings described below are merely some embodiments of the present application, and other drawings may be obtained without creative effort by one of ordinary skill in the art in accordance with the structure shown in these drawings.

Figure 1:
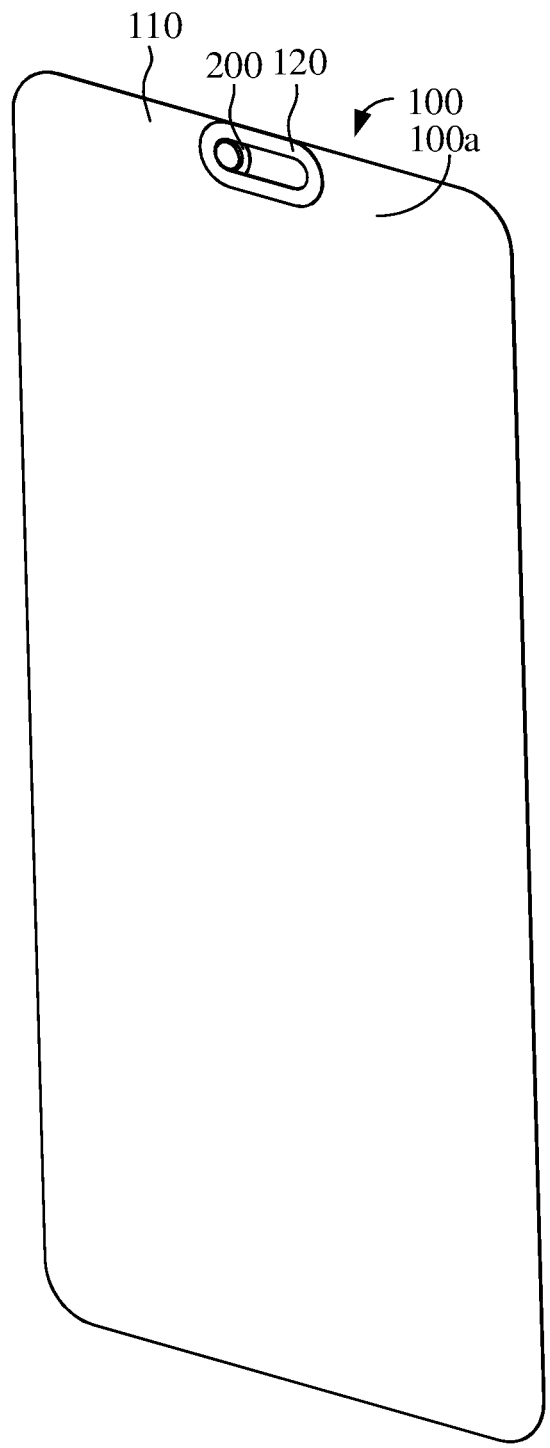
FIG. 1 is a schematic structural view of an embodiment of a protective film of electronic terminal of the present application.

The realization of the purposes, functional features and advantages of the present application will be further explained with reference to the accompanying drawings in combination with the embodiments.

DETAILED DESCRIPTION OF THE EMBODIMENTS

The technical aspects of the embodiments of the present application will be described clearly and completely in conjunction with the accompanying drawings of the embodiments of the present application. It is obvious that the described embodiments are only some and not all of the embodiments of the present application. Based on the embodiments in the present application, all other embodiments obtained by those of ordinary skill in the art without creative labor fall within the scope of the present application.

It should be noted that if there is a directional indication (such as up, down, left, right, front, rear, etc.) in the embodiment of the present application, the directional indication is only used to explain the relative positional relationship and movement between the components under a specific posture (as shown in the drawings). If the specific posture changes, the directional indication will also change accordingly.

In addition, if there are descriptions relating to "first", "second" and the like in embodiments of the present application, the descriptions of "first", "second" and the like are for descriptive purposes only and cannot be understood to indicate or imply their relative importance or imply the number of indicated technical features. Thus, a feature defined as "first" or "second" may explicitly or implicitly include at least one such feature. In addition, if "and/or" appears in the whole context, it means including three parallel schemes, taking "A and/or B" as an example, including scheme A, scheme B, or both schemes A and B. In addition, the technical solutions between various embodiments can be combined with each other, but it must be based on the realization of those skilled in the art. When the combination of technical solutions contradicts or cannot be realized, it should be considered that such combination of technical solutions does not exist and is not within the scope claimed by the present application.

Figure 8:
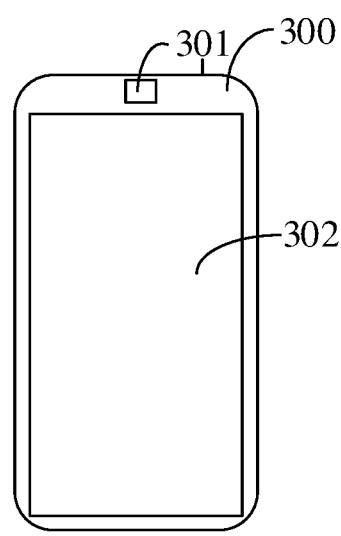
FIG. 8 is a schematic diagram of an electronic terminal using the protective film of electronic terminal of the embodiments of the present embodiment.

Referring to FIG. 8, the present application provides a protective film of electronic terminal 100, which is configured to be attached to an electronic terminal 300 mounted with a camera 301 and protect a screen 302 of the electronic terminal 300.

Figure 2:
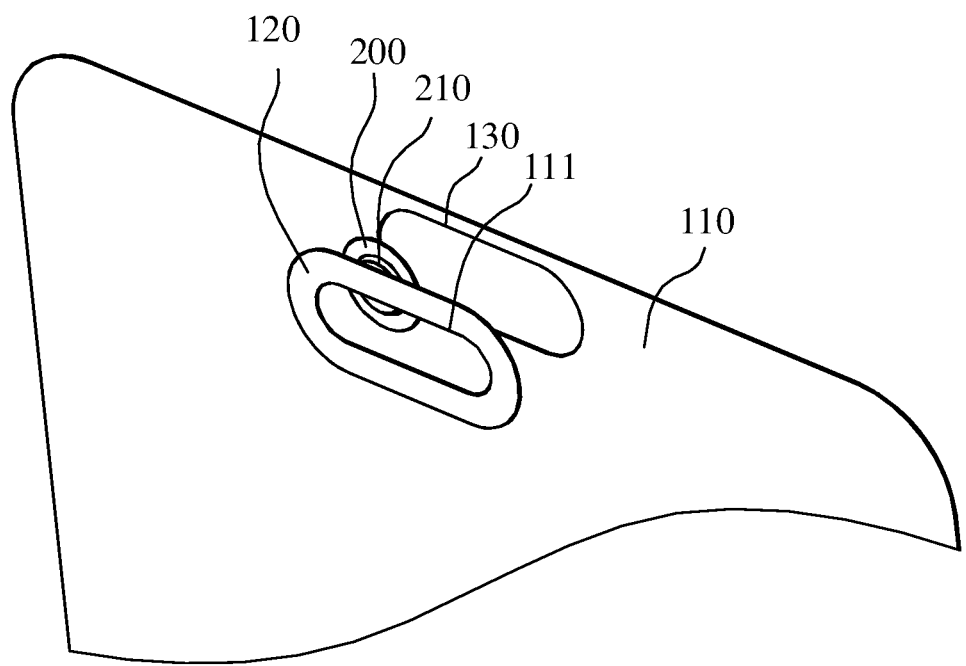
FIG. 2 is a schematic disassembled view of a portion of the protective film of electronic terminal in FIG. 1.

In one embodiment of the present application, as shown in FIGS. 1 and 2, the protective film of electronic terminal includes a protective film body 100 and a shielding member 200. The protective film body 100 is provided with an avoidance hole 130 and an accommodation cavity 140, and the avoidance hole 130 is in communication with the accommodation cavity 140, and configured to avoid the camera when the protective film body 100 is attached to the electronic terminal 300, so that when a user needs to use the camera 301, the camera 301 is not shielded by the protective film body 100, ensuring that the camera 301 can be used normally. The shielding member 200 is movably disposed in the accommodation cavity 140, and configured to shield or not shield the camera 301. When the shielding member 200 is located at a position where the avoidance hole 130 is located, the camera 301 is shielded by the shielding member 200, thereby protecting the privacy of the user. When the shielding member 200 is moved to a position deviating from the avoidance hole 130 in the accommodating cavity 140, the camera 301 is not shielded by the shielding member 200, thereby enabling the camera 301 to be used normally.

By adopting the protective film body 100, the technical scheme of the present application can play a role of protecting the screen 302, prevent the screen 302 from being scratched, at the same time, it reduces the probability of the screen 302 being smashed. By adopting the avoidance hole 130 and the accommodating cavity 140 defined on the protective film body 100, the avoidance hole 130 avoids the camera 301, the shielding member 200 is movably disposed in the accommodating cavity 140, and can be moved to different positions of shielding the camera 301 or not shielding the camera 301 in the accommodating cavity 140. When the camera 301 needs to be used, the shielding member 200 can be moved to a position where the camera 301 is not shielded, thus to normally use the camera 301, when the camera 301 is not needed, the shielding member 200 can be moved to the position of shielding the camera 301, thereby protecting the privacy of the user, that is, the technical scheme of the present application can protect the privacy of the user while protecting the screen 302.

In some embodiments, the protective film body 100a includes a first bonding layer 110 and a second bonding layer 120. The first bonding layer 110 is attached to the electronic terminal 300 to protect the screen 302, and the avoidance hole 130 penetrates through the first bonding layer 110 and the second bonding layer 120. An edge of the second bonding layer 120 is attached to the first bonding layer 110, and a position corresponding to a middle portion of the second bonding layer 120 forms the accommodating cavity 140 to cover the shielding member 200. When the protective film 100 is attached to the electronic terminal 300 to protect the screen 302, the shielding member 200 can play a role in protecting privacy, and no limiting and fixing structure for limiting and fixing the shielding member 200 is needed.

In some embodiments, the second bonding layer 120 has a shape matching a shape of the avoidance hole 130, and the edge of the second bonding layer 120 is bonded with a periphery of the avoidance hole 130. It can be understood that a size of the second bonding layer 120 may be the same as a size of the first bonding layer 110, or may be adaptively reduced according to a size of the avoidance hole 130 to save raw materials.

In one embodiment, the edge of the second bonding layer 120 and the first bonding layer 110 are hot-pressed and bonded. By hot-pressing and bonding the edge of the second bonding layer 120 and the first bonding layer 110, the forming process of the accommodating cavity 140 is simple and convenient, and it brings less damage to the protective film body 100, thereby prolonging the service life of the protective film body 100. Further, after the edge of the second bonding layer 120 and the first bonding layer 110 are hot-pressed and bonded to each other, the second bonding layer 120 and the first bonding layer 110 form a bag-like structure which covers the shielding member 200, so that the shielding member 200 is not easy to fall off during the use of the electronic terminal protective film 100, and better protects the privacy of the user.

In one embodiment, the edge of the second bonding layer 120 and the first bonding layer 110 are hot-pressed and bonded, the middle portion of the second bonding layer 120 is protruded upwardly, and a height of the upward protrusion of the second bonding layer 120 matches a thickness of the shielding member 200, so as to form the accommodating cavity 140 in the middle portion of the protective film body 100a. As that the second bonding layer 120 is protruded upward to form the accommodating cavity 140 matched with the thickness of the shielding member 200, when the shielding member 200 is positioned in the accommodating cavity 140, the extrusion and friction between the shielding member 200 and inner walls of the accommodating cavity 140 are small, thereby making the shielding member 200 move more smoothly in the accommodating cavity 140.

In one embodiment, the second bonding layer 120 is provided with a strip-shaped avoidance groove 111, the avoidance groove 111 is in communication with the avoidance hole 130, the shielding member 200 is at least partially exposed in the avoidance groove 111, and the shielding member 200 is arranged so that the user slides the shielding member 200 along a length extension direction of the avoidance groove 111. By providing the avoidance groove 111, the user can directly contact the shielding member 200, so that the shielding member 200 can be slid more smoothly, and it is more convenient for the user to move the shielding member 200.

In one embodiment, the shielding member 200 is provided with a protrusion 210 extended out of the avoidance groove 111 and configured for the user to slide the shielding member 200 along the length extension direction of the avoidance groove 111. The arrangement of the protrusion 210 provides a more convenient focus for the user to move the shielding member 200, so that it is more convenient for the user to move the shielding member 200. The arrangement of the avoidance groove 111 enables the protrusion to slide along the length extension direction of the avoidance groove 111, so as to prevent the user from sliding the shielding member 200 in a wrong direction and causing impact on the bonding place between the second bonding layer 120 and the first bonding layer 110, and avoid damage to the protective film body 100a during the sliding process of the shielding member 200.

Figure 3:
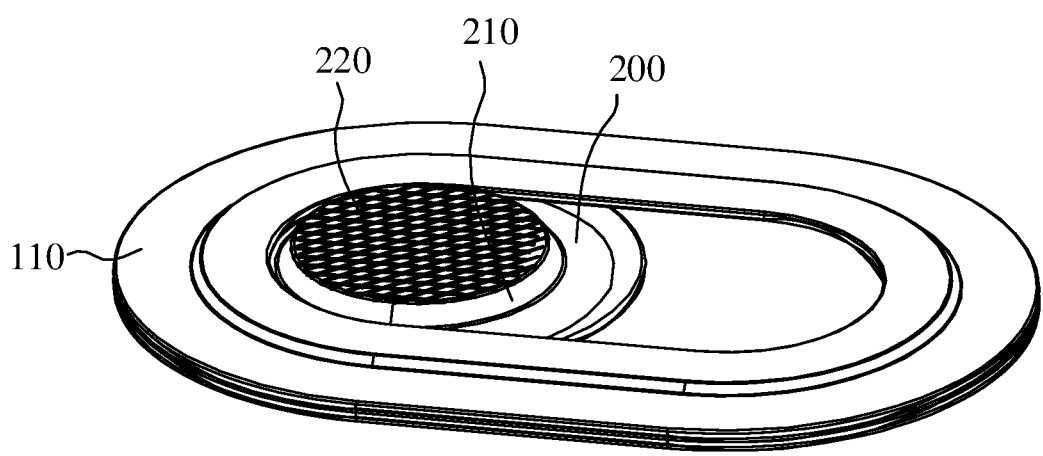
FIG. 3 is a schematic structural view of a second bonding layer and a shielding member according to another embodiment of the protective film of electronic terminal of the present application.
Figure 4:
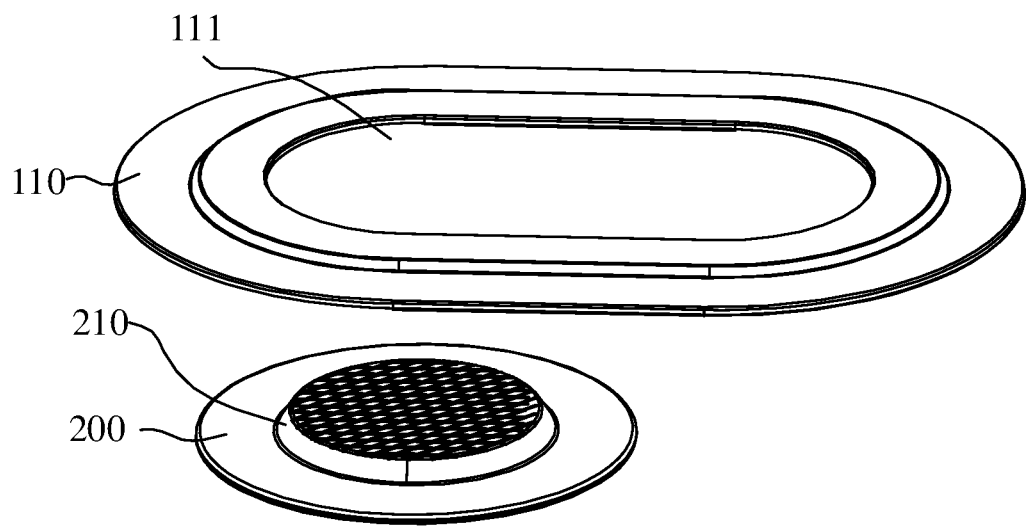
FIG. 4 is a schematic disassembled view of the second bonding layer and the shielding member of FIG. 3.
Figure 5:
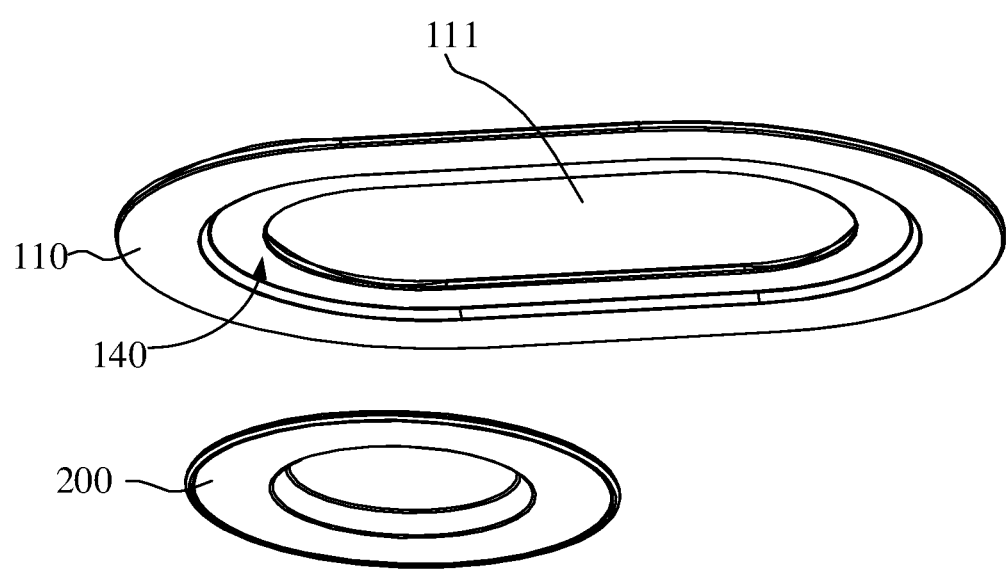
FIG. 5 is a schematic structural view of the second bonding layer and the shielding member of FIG. 4 from another perspective.

Referring to FIGS. 3 to 5, in an embodiment, the shielding member 200 is completely located in the avoidance groove 111, and a surface of the shielding member 200 is provided with anti-skid lines 220, thereby increasing the friction when the user moves the shielding member 200, and making the movement smoother.

In one embodiment, the protrusion 210 is shaped as a truncated cone, and an upper surface of the protrusion 210 is provided with the anti-skid lines 220, thereby increasing the friction when the user moves the shielding member 200, and making the movement smoother. In addition, the truncated cone-shaped arrangement enables the electronic terminal to be placed more stably.

Figure 6:
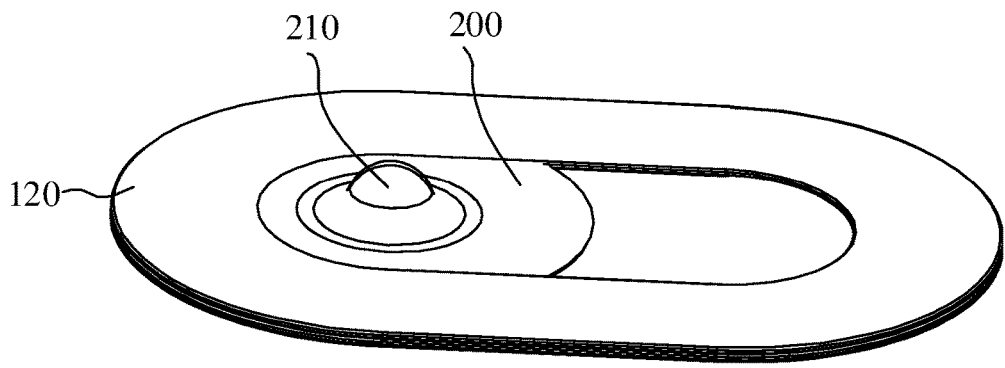
FIG. 6 is a schematic structural view of a portion of the protective film of electronic terminal according to another embodiment of the present application.
Figure 7:
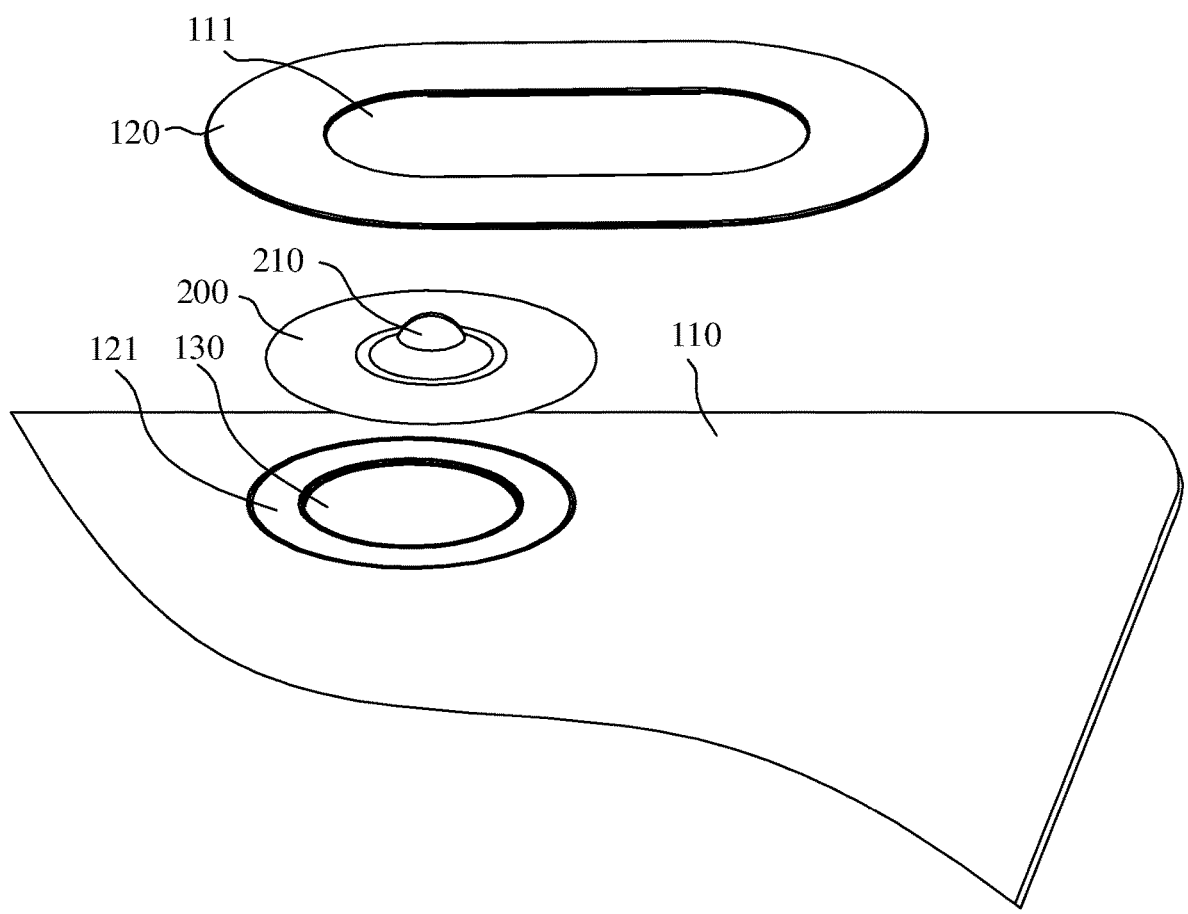
FIG. 7 is a schematic disassembled view of the protective film of electronic terminal of FIG. 6.

Referring to FIGS. 6 and 7, in one embodiment, the protrusion 210 is shaped as a hemispherical or is another type arc-shaped protrusion, so that the surface of the protrusion 210 is smooth, reducing the wear of the notch of the avoidance groove 111 by the protrusion 210 during the sliding process of the shielding member 200 and prolonging the service life of the protective film body 100a.

In one embodiment, the shielding member 200 is an opaque circular piece. The camera is shielded by the opaque circular piece, thus protecting the privacy of the user. Since the shielding member 200 is a circular piece, when the user slides the shielding member 200, a contact area between a side wall of the shielding member 200 in a thickness direction and the cavity wall of the accommodating cavity 140 is small, and thus the resistance in the sliding process is small. The shielding member 200 can be quickly slid off when the camera 301 needs to be used, and the convenience of use is improved. The shielding member 200 can be quickly slide to shield the camera 140 when the camera is not needed, the convenience of operation is improved, and the probability that the user chooses to give up the operation of sliding the shielding member 200 to shield the camera 301 because the operation is not convenient enough is reduced, thereby reducing the probability of the leakage of the user's privacy. In an embodiment, an surface of the shielding member 200 is presented as a black matte surface, which plays a shielding role and does not generate dazzling reflection.

Referring to FIG. 7, in an embodiment, both the first bonding layer 110 and the second bonding layer 120 have inner sides facing inside of the accommodating cavity 140, and the inner sides of the first bonding layer 110 or the inner sides of the second bonding layer 120 are defined with a sinking groove 121 corresponding to the periphery of the avoidance hole 130. A shape of the sinking groove 121 matches a shape of the shielding member 200, and is configured to accommodate the shielding member 200 when the shielding member 200 shields the camera, so that when the camera does not need to be used and the camera is shielded by the shielding member 200, the shielding member 200 is received in the sinking groove 121. Understandably, the time of the state that the shielding member 200 does not shield the camera 301 is only the time when the user uses the camera 301, which accounts for a small portion of the user's use of the electronic terminal 300. The time of the state that the shielding member 200 shields the camera 301 accounts for a big portion of the user's use of the electronic terminal 300. In this embodiment, the sinking groove 121 is provided at the periphery of the avoidance hole 130, so that when the shielding member 200 shields the camera 301, the shielding member 200 is accommodated in the sinking groove 121, so that it avoids the occurrence of the shielding member 200 being supported by the protective film 100 for a long time during most of the time the user using the electronic terminal 300 and causing damage to the protective film body 100a.

In one embodiment, the notch of the sinking groove 121 is rounded to make the notch of the sinking groove 121 smooth on one hand, thereby preventing the notch of the sinking groove 121 from abrading the second bonding layer 120 after the shielding member 200 leaves the sinking groove 121, and on the other hand to enable the user to slide the shielding member 200 out of the sinking groove 121 more smoothly, which is convenient for use.

In one embodiment, the protective film body 100a is transparent. The first bonding layer 110 has an inner side toward the inside of the accommodating cavity 140, an opaque warning portion (not shown) is provided on the inner side of the first bonding layer 110 corresponding to the periphery of the avoidance hole 130. A shape of the warning portion is matched with the shape of the shielding member 200, and is configured to warn the user when the shielding member 200 does not shield the camera 301, so as to remind the user that the camera is not shielded, and attention should be paid to shielding the camera 301 or exposing privacy in front of the camera 301, thereby reducing the probability of privacy leakage.

In one embodiment, the warning portion is a red opaque layer, and the red opaque layer can be arranged on the periphery of the avoidance hole 130 by means of hot pressing, adhesion, coating, or the like, so that the process is simple, the warning portion is more eye-catching, and the user is better reminded that the camera is not shielded, thereby reducing the probability of privacy leakage.

In other embodiments, the warning portion can be arranged as an opaque layer of another color, such as a fluorescent color, to achieve a striking effect, so that users can more easily find that the camera is not shielded, thereby reducing the probability of privacy leakage.

In the above embodiment, the first bonding layer 110 has an outer side facing the outside of the accommodating cavity 140, and the outer side of the first bonding layer 110 is provided with an adhesive layer (not shown in the figures), so that the protection film of electronic terminal 100 is easily attached to the electronic terminal 300, and not easy to fall off, thereby better protecting the privacy of the user.

In some embodiments, the adhesive layer is 3M double-sided adhesive tape, which has good adhesion effect and is convenient and quick to operate, such as non-woven substrate double-sided adhesive tape, non-substrate double-sided adhesive tape, PET substrate double-sided adhesive tape, foam substrate double-sided adhesive tape, hot melt adhesive film, high temperature resistant adhesive tape, or the like.

In one embodiment, the adhesive layer is provided with a release paper, and the release paper completely covers the first bonding layer 110, and is provided with a protruding portion beyond the first bonding layer 110, thereby facilitating the user to tear off the release paper from the adhesive layer when attaching the protection film of electronic terminal 100 to the terminal 300, and improving the convenience of operation.

In the above-described embodiment, each of thicknesses of the second bonding layer 120, the first bonding layer 110, and the shielding member 200 is ranged from 0.1 mm to 0.2 mm. It can be understood that the greater the thickness of the protective film of electronic terminal 100, the greater the negative impact on the user's comfort. In the above embodiment, the thicknesses of the second bonding layer 120, the first bonding layer 110, and the shielding member 200 are set to be less than or equal to 0.2 mm, thereby ensuring the user's comfort. The smaller the thickness of the protective film of electronic terminal, the higher the processing difficulty and cost. In the above embodiment, the thicknesses of the second bonding layer 120, the first bonding layer 110, and the shielding member 200 are set to be greater than or equal to 0.1 mm, thereby reducing the production and processing difficulty and cost of the protective film of electronic terminal 100 on the premise of ensuring the user's comfort.

Specifically, each of the thicknesses of the second bonding layer 120, the first bonding layer 110, and the shielding member 200 may be set to 0.1 mm, 0.15 mm, 0.18 mm or 0.2 mm. Alternatively, the thicknesses of the second bonding layer 120, the first bonding layer 110, and the shielding member 200 may be set to be different but all are in the range of 0.1 mm to 0.2 mm, so that the requirement of processing accuracy is reduced and the difficulty of production and processing is further reduced on the premise of ensuring the user's comfort.

The foregoing is only an alternative embodiment of the present application, and is not intended to limit the scope of the present application. All equivalent structural changes made under the inventive concept of the present application, using the contents of the specification and drawings of the present application, or direct/indirect application in other related technical fields are included in the claimed scope of the present application.

What is claimed is:

1. A protective film of electronic terminal configured to be attached to an electronic terminal on which a camera is mounted and protect a screen of the electronic terminal, wherein the protective film of electronic terminal comprises: a protective film body defined with an avoidance hole and an accommodating cavity, wherein the avoidance hole is configured to avoid the camera when the protective film body is attached to the electronic terminal and in communication with the accommodating cavity; and a shielding member movably arranged in the accommodating cavity and configured to shield or not shield the camera, wherein the protective film body comprises a first bonding layer and a second bonding layer, the first bonding layer is configured to be attached to the electronic terminal, the avoidance hole penetrating through the first bonding layer and the second bonding layer, an edge of the second bonding layer being attached to the first bonding layer, and the accommodating cavity being formed at a position corresponding to a middle portion of the second bonding layer and configured to cover the shielding member.

2. The protective film of electronic terminal according to claim 1, wherein the second bonding layer is defined with a long strip-shaped avoidance groove communicating with the avoidance hole, and the shielding member is at least partially exposed to the avoidance groove, and configured for a user to slide the shielding member along a length extension direction of the avoidance groove.

3. The protective film of electronic terminal according to claim 2, wherein the shielding member is provided with a protrusion protruded outside the avoidance groove; or,
the shielding member is completely located in the avoidance groove, and a surface of the shielding member is provided with anti-skid lines.

4. The protective film of electronic terminal according to claim 3, wherein each of the second bonding layer, the first bonding layer, and the shielding member has a thickness ranged from 0.1 mm to 0.2 mm.

5. The protective film of electronic terminal according to claim 2, wherein the shielding member is an opaque circular piece.

6. The protective film of electronic terminal according to claim 5, wherein each of the second bonding layer, the first bonding layer, and the shielding member has a thickness ranged from 0.1 mm to 0.2 mm.

7. The protective film of electronic terminal according to claim 2, wherein each of the second bonding layer, the first bonding layer, and the shielding member has a thickness ranged from 0.1 mm to 0.2 mm.

8. The protective film of electronic terminal according to claim 1, wherein each of the first bonding layer and the second bonding layer has an inner side facing inside of the accommodating cavity, the inner side of the first bonding layer or the inner side of the second bonding layer is defined with a sinking groove corresponding to a periphery of the avoidance hole, and a shape of the sinking groove is matched with a shape of the shielding member, and the sinking groove is configured to accommodate the shielding member when the shielding member shields the camera.

9. The protective film of electronic terminal according to claim 8, wherein a notch of the sinking groove is rounded.

10. The protective film of electronic terminal according to claim 9, wherein each of the second bonding layer, the first bonding layer, and the shielding member has a thickness ranged from 0.1 mm to 0.2 mm.

11. The protective film of electronic terminal according to claim 8, wherein each of the second bonding layer, the first bonding layer, and the shielding member has a thickness ranged from 0.1 mm to 0.2 mm.

12. The protective film of electronic terminal according to claim 1, wherein, the protective film body is transparent, the first bonding layer has an inner side facing inside of the accommodating cavity, and the inner side of the first bonding layer is provided with an opaque warning portion corresponding to a periphery of the avoidance hole, a shape of the warning portion is matched with a shape of the shielding member, and the warning portion is set to warn a user when the shielding member does not shield the camera.

13. The protective film of electronic terminal according to claim 12, wherein each of the second bonding layer, the first bonding layer, and the shielding member has a thickness ranged from 0.1 mm to 0.2 mm.

14. The protective film of electronic terminal according to claim 1, wherein the first bonding layer has an outer side facing outside of the accommodating cavity, and the outer side of the first bonding layer is provided with an adhesive layer configured to adhere the protective film of electronic terminal to the electronic terminal.

15. The protective film of electronic terminal according to claim 1, wherein each of the second bonding layer, the first bonding layer, and the shielding member has a thickness ranged from 0.1 mm to 0.2 mm.

* * * * *